US012743241B2

(12) United States Patent
Xie et al.

(10) Patent No.: US 12,743,241 B2
(45) Date of Patent: Sep. 22, 2026

(54) MANAGEMENT METHOD AND MANAGEMENT APPARATUS FOR HYBRID MEMORY SYSTEM, DEVICE, AND MEDIUM

(71) Applicant: Suzhou MetaBrain Intelligent Technology Co., Ltd., Suzhou (CN)

(72) Inventors: Zhiyong Xie, Suzhou (CN); Rengang Li, Suzhou (CN); Chuang Zhang, Suzhou (CN); Min Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/469,558

(22) PCT Filed: Sep. 27, 2024

(86) PCT No.: PCT/CN2024/121946
§ 371 (c)(1),
(2) Date: Sep. 26, 2025

(87) PCT Pub. No.: WO2025/102997
PCT Pub. Date: May 22, 2025

(65) Prior Publication Data

US 2026/0119086 A1 Apr. 30, 2026

(30) Foreign Application Priority Data

Nov. 14, 2023 (CN) ......................... 202311511069.6

(51) Int. Cl.
*G06F 12/00* (2006.01)
*G06F 3/06* (2006.01)

(52) U.S. Cl.
CPC ............ *G06F 3/068* (2013.01); *G06F 3/0604* (2013.01); *G06F 3/0655* (2013.01)

(58) Field of Classification Search
CPC ..... G06F 3/0625; G06F 3/0659; G06F 3/0673
(Continued)

(56) References Cited

U.S. PATENT DOCUMENTS 11,768,615 B1 * 9/2023 Zhou ................. G11C 11/40626 711/170
2016/0378655 A1 12/2016 Blagodurov et al.
(Continued)

FOREIGN PATENT DOCUMENTS

CN 104346284 A 2/2015
CN 104881369 A 9/2015
(Continued)

OTHER PUBLICATIONS

International Search Report of corresponding PCT application (PCT/CN2024/121946) Jan. 10, 2025, 7 pages.
(Continued)

*Primary Examiner* — Mohamed M Gebril
(74) *Attorney, Agent, or Firm* — Cooper Legal Group, LLC

(57) ABSTRACT

The present application relates to a management method and management apparatus for a hybrid memory system, a device, and a medium. The method includes: acquiring a write hotness value and an access hotness value of a currently accessed memory page; comparing the write hotness value with a specified write hotness threshold, generating write hotness page migration flag information; comparing the access hotness value with a specified access hotness threshold, generating access hotness page migration flag information; grouping a hybrid memory, generating memory page management information corresponding to the hybrid memory based on memory page information of all grouped memory banks; determining whether the currently accessed memory page is a hot data page based on the write hotness
(Continued)

page migration flag information, the access hotness page migration flag information, and current memory page management information, performing data migration based on a preset cold and hot data page migration strategy.

20 Claims, 4 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2017/0277640 | A1 | 9/2017 | Jin et al. |
| 2018/0107598 | A1 | 4/2018 | Prodromou et al. |
| 2018/0232173 | A1 | 8/2018 | Chung et al. |

FOREIGN PATENT DOCUMENTS

| | | | |
|---|---|---|---|
| CN | 105786725 | A | 7/2016 |
| CN | 106294192 | A | 1/2017 |
| CN | 107193646 | A | 9/2017 |
| CN | 108804350 | A | 11/2018 |
| CN | 109901800 | A | 6/2019 |
| CN | 109960471 | A | 7/2019 |
| CN | 110134492 | A | 8/2019 |
| CN | 110532200 | A | 12/2019 |
| CN | 111984188 | A | 11/2020 |
| CN | 112015669 | A | 12/2020 |
| CN | 112148486 | A | 12/2020 |
| CN | 112181870 | A | 1/2021 |
| CN | 115905049 | A | 4/2023 |
| CN | 116578409 | A | 8/2023 |
| CN | 117056087 | A | 11/2023 |
| CN | 117234432 | A | 12/2023 |

OTHER PUBLICATIONS

Written Opinion of International Searching Authority of corresponding PCT application (PCT/CN2024/121946) Jan. 10, 2025, 8 pages.
First Office Action of corresponding CN priority application (CN202311511069.6) Dec. 19, 2023, 9 pages.
Notification to Grant Patent Right for Invention of corresponding CN priority application (CN202311511069.6) Jan. 6, 2024, 2 pages.

* cited by examiner

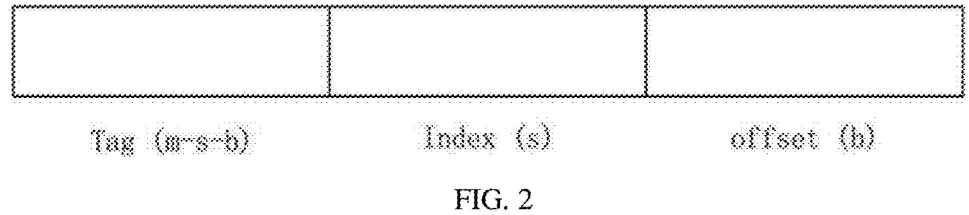
FIG. 2
| Serial number | 12-13-bit address | Program group number |
|---|---|---|
| 1 | 00 | 1 |
| 2 | 01 | 2 |
| 3 | 10 | 3 |
| 4 | 11 | 4 |
FIG. 3
Write access counter
| 2 | 3 | 1 | 5 | 6 | . . . | 4 | 3 | 2 | 1 | 2 | 3 |
|---|---|---|---|---|---|---|---|---|---|---|---|
Read access counter
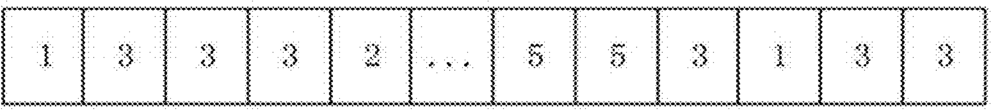
| 1 | 3 | 3 | 3 | 2 | . . . | 5 | 5 | 3 | 1 | 3 | 3 |
|---|---|---|---|---|---|---|---|---|---|---|---|
FIG. 4

MANAGEMENT METHOD AND MANAGEMENT APPARATUS FOR HYBRID MEMORY SYSTEM, DEVICE, AND MEDIUM

CROSS-REFERENCE TO RELATED APPLICATION

This application claims priority to Chinese Patent Application No. 202311511069.6, filed on Nov. 14, 2023 in China National Intellectual Property Administration and entitled "Management Method and Management Apparatus for Hybrid Memory System, Device, and Medium", which is hereby incorporated by reference in its entirety.

FIELD

The present application relates to the technical field of hybrid memories, and in particular to a management method and management apparatus for a hybrid memory system, a device, and a medium.

BACKGROUND

The conventional dynamic random access memory (DRAM) has excellent performance, but faces challenges in scalability and high energy consumption. Emerging non-volatile storage technology has higher storage density and lower energy consumption, can persistently store data, but has the problems of high write latency, short lifespan, and the like. Therefore, constructing a hybrid memory system by a small number of DRAMs and high-capacity non-volatile memories (NVMs) has become a hot research direction in both academia and industry, where the advantages of large capacity, high density, and low energy consumption of the NVMs are fully leveraged, and the overall performance of the system is improved by the DRAMs.

Currently, DRAM-NVM hybrid memory systems have two different organizational architectures: One is a "vertical" management architecture, where DRAMs and NVMs are placed at different memory levels, and the faster DRAMs serve as caches for NVMs. The other one is a "horizontal" management architecture of DRAMs and NVMs, where DRAMs and NVMs are placed at the same levels in the memory hierarchy and form a same address space.

In the hybrid memory system of the horizontal architecture, due to different latencies of the two storage media DRAMs and NVMs, dynamic changes in coldness and hotness of data and linkage between a main memory system and a cache (i.e., cache memory, which is a primary memory between a main memory and a central processing unit (CPU)) affect the overall performance of the hybrid memory system.

Therefore, it is necessary to improve existing management methods for hybrid memories of horizontal architectures and enhance the overall performance of hybrid memory systems of horizontal architectures.

SUMMARY

The present application provides a management method for a hybrid memory system, including:

acquiring a write hotness value and an access hotness value of a currently accessed memory page;

comparing the write hotness value with a specified write hotness threshold, and generating write hotness page migration flag information;

comparing the access hotness value with a specified access hotness threshold, and generating access hotness page migration flag information;

grouping a hybrid memory in the hybrid memory system, and generating memory page management information corresponding to the hybrid memory based on memory page information of all grouped memory banks; and determining whether the currently accessed memory page is a hot data page based on the write hotness page migration flag information, the access hotness page migration flag information, and current memory page management information corresponding to the currently accessed memory page, and performing data migration based on a preset cold and hot data page migration strategy.

Further, the grouping a hybrid memory in the hybrid memory system, and generating memory page management information corresponding to the hybrid memory based on memory page information of all grouped memory banks includes:

dividing the hybrid memory in the hybrid memory system into a plurality of grouped memory banks based on a preset unified memory group capacity and a preset unified memory group memory ratio, and marshaling all the grouped memory banks, where each grouped memory bank includes at least one dynamic random access memory area and at least one non-volatile memory area, and the preset unified memory group memory ratio is a ratio of the dynamic random access memory area to the non-volatile memory area in each grouped memory bank;

generating the memory page management information corresponding to the hybrid memory based on the memory page information of all the grouped memory banks, where the memory page management information includes memory page attribute information, and the memory page attribute information includes grouped memory bank numbers, a lowest memory read-write attribute level, and a highest memory read-write attribute level; and acquiring programs in the system and specified grouped memory banks corresponding to the programs, and generating a memory group mapping relationship based on program calibration information of memory programs and grouped memory bank numbers of specified grouped memory banks corresponding to the memory programs.

Further, the method further includes:

acquiring a memory allocation request parameter corresponding to a current memory program, where the memory allocation request parameter includes a memory read-write attribute level parameter;

determining whether the memory read-write attribute level parameter reaches a preset read-write attribute level threshold; and in response to that the memory read-write attribute level parameter reaches the preset read-write attribute level threshold, allocating a memory area in a specified grouped memory bank corresponding to the current memory program to the current memory program based on a first memory allocation principle, where the first memory allocation principle is: preferentially allocating the dynamic random access memory area, and allocating the non-volatile memory area when the dynamic random access memory area is insufficient; or in response to that the memory read-write attribute level parameter does not reach the preset read-write attribute level threshold, allocating the memory area in the specified grouped memory bank corresponding to the current memory program to the current memory program based on a second memory allocation principle, where the second memory allocation principle is: preferentially allocating the non-volatile memory area, and allocating a write attribute memory area when the non-volatile memory area is insufficient.

Further, the marshaling all the grouped memory banks includes:

addressing all the grouped memory banks based on a preset addressing rule to generate grouped memory bank physical addresses corresponding to the grouped memory banks;

the method further includes:

acquiring cache index bit information of cache slices in a cache, and allocating, to the cache slice at each specific cache index bit, hot data configured for saving a specific physical memory address; and generating a cache physical address mapping relationship based on the specific physical memory address and slice annotation information of the cache slices.

Further, the generating a cache physical address mapping relationship includes:

querying a specific cache slice corresponding to the specific physical memory address based on memory index bit information in the specific physical memory address, where the memory index bit information matches cache slice numbers one by one;

in response to that memory annotation bit information in the specific physical memory address matches slice annotation bit information in the specific cache slice, querying a corresponding specific cache channel from the specific cache slice based on the memory annotation bit information; and generating the cache physical address mapping relationship based on the specific physical memory address and information of the specific cache channel.

Further, the method further includes:

acquiring a current grouped memory bank corresponding to a current program based on the memory group mapping relationship, and acquiring a current grouped memory bank memory page physical address corresponding to the current grouped memory bank;

acquiring current memory annotation bit information corresponding to the current grouped memory bank memory page physical address, and selecting a specific current memory page based on the current memory annotation bit information; and allocating a dynamic random access memory page corresponding to the current memory page to a write-intensive data page of the current program; and allocating a non-volatile memory page corresponding to the current memory page to a read-intensive data page of the current program.

Further, the generating a memory group mapping relationship includes:

performing remainder calculation on program ID information of each memory program and a total number of memory groups in all the grouped memory banks, using remainder calculation results as grouped memory bank numbers that the memory programs are able to access, and dividing memory programs with the same remainder calculation result into one group.

Further, the performing data migration based on a preset cold and hot data page migration strategy includes:

in response to that both the write hotness page migration flag information and the access hotness page migration flag information are set, if the currently accessed memory page does not belong to the dynamic random access memory area and a specific bit of a memory address corresponding to the currently accessed memory page does not conform to a specific value of a current running program, acquiring a dynamic random access memory area of the grouped memory bank where the currently accessed memory page is located, querying the dynamic random access memory area for an updated memory page with a memory address that meets program grouping requirements, and migrating data to the updated memory page.

Further, the performing data migration based on a preset cold and hot data page migration strategy includes:

in response to that the write hotness page migration flag information is set and the access hotness page migration flag information is not set, if the currently accessed memory page does not belong to the dynamic random access memory area, acquiring a dynamic random access memory area of the grouped memory bank where the currently accessed memory page is located, querying the dynamic random access memory area for an updated memory page with a memory address that meets program grouping requirements, and migrating data to the updated memory page.

Further, the performing data migration based on a preset cold and hot data page migration strategy includes:

in response to that the write hotness page migration flag information is not set, but the access hotness page migration flag information is set, if the lowest memory read-write attribute level allocated to the currently accessed memory page is greater than a preset lowest memory read-write attribute level threshold, determining whether the currently accessed memory page belongs to the dynamic random access memory area, and whether a specific bit of a memory address corresponding to the currently accessed memory page conforms to a specific value of a program group; and in response to that at least one of the determinations does not meet requirements, acquiring a dynamic random access memory area of the grouped memory bank where the currently accessed memory page is located, querying the dynamic random access memory area for an updated memory page with a memory address that meets program grouping requirements, and migrating data to the updated memory page.

Further, the performing data migration based on a preset cold and hot data page migration strategy includes:

in response to that the write hotness page migration flag information is not set, but the access hotness page migration flag information is set, if the highest memory read-write attribute level allocated to the currently accessed memory page is greater than a preset highest memory read-write attribute level threshold, determining whether the currently accessed memory page belongs to the dynamic random access memory area, and whether a specific bit of a memory address corresponding to the currently accessed memory page conforms to a specific value of a program group; and in response to that at least one of the determinations does not meet requirements, acquiring a dynamic random access memory area of the grouped memory bank where the currently accessed memory page is located, querying the dynamic random access memory area for an updated memory page with a memory address that meets program grouping requirements, and migrating data to the updated memory page.

Further, the performing data migration based on a preset cold and hot data page migration strategy includes:

in response to that both the write hotness page migration flag information and the access hotness page migration flag information are not set, keeping the currently accessed memory page unchanged.

Further, before the acquiring a write hotness value and an access hotness value of a currently accessed memory page, the method further includes:

configuring corresponding high-frequency write access page linked lists and high-frequency access memory linked lists based on the information of the grouped memory banks.

Further, the comparing the write hotness value with a specified write hotness threshold, and generating write hotness page migration flag information includes:

in response to that the write hotness value is greater than the specified write hotness threshold and the currently accessed memory page is located in a high-frequency write access page linked list of a corresponding grouped memory bank, clearing a write hotness page migration flag, and generating the write hotness page migration flag information.

Further, the comparing the write hotness value with a specified write hotness threshold, and generating write hotness page migration flag information includes:

in response to that the write hotness value is greater than the specified write hotness threshold and the currently accessed memory page is not in a high-frequency write access page linked list of a corresponding grouped memory bank, determining whether a quantity of members in the high-frequency write access page linked list reaches a specified threshold;

in response to that the quantity does not reach the specified threshold, setting a write hotness page migration flag, and generating the write hotness page migration flag information; and in response to that the quantity reaches the specified threshold, comparing write access hotness values of all members in the high-frequency write access page linked list with the write hotness value corresponding to the currently accessed memory page; in response to that the write hotness value is less than the write access hotness values, clearing the write hotness page migration flag, and generating the write hotness page migration flag information; or in response to that the write hotness value is not less than the write access hotness values, setting the write hotness page migration flag, and generating the write hotness page migration flag information.

Further, the comparing the write hotness value with a specified write hotness threshold, and generating write hotness page migration flag information includes:

in response to that the write hotness value does not exceed the specified write hotness threshold, clearing a write hotness page migration flag, and generating the write hotness page migration flag information.

Further, the acquiring a write hotness value and an access hotness value of a currently accessed memory page includes:

calculating the write hotness value of the currently accessed memory page through the following formula: $Hot_{write}=a_{11}f_0+a_{12}f_1+a_{13}f_2+a_{14}f_3+a_{15}f_4$, where $f_0$ represents a proportion of write access requests for the page among M write access requests in a write access counter;

$f_1$ represents a proportion of the write access requests for the page among latest N write access requests in the write access counter;

$f_2$ represents a proportion of the write access requests for the page among latest P write access requests in the write access counter;

$f_3$ represents a proportion of the write access requests for the page among latest Q write access requests in the write access counter;

$f_4$ represents a proportion of the write access requests for the page among latest R write access requests in the write access counter;

$a_{11}$, $a_{12}$, $a_{13}$, $a_{14}$, and $a_{15}$ are weight parameters, and $a_{11}+a_{12}+a_{13}+a_{14}+a_{15}=1$;

calculating a read access hotness value of the currently accessed memory page through the following formula: $Hot_{read}=a_{21}f_0+a_{22}f_1+a_{23}f_2+a_{24}f_3+a_{25}f_4$, where $f_0$ represents a proportion of read access requests for the page among M read access requests in a read access counter;

$f'_1$ represents a proportion of the read access requests for the page among latest N read access requests in the read access counter;

$f'_2$ represents a proportion of the read access requests for the page among latest P read access requests in the read access counter;

$f'_3$ represents a proportion of the read access requests for the page among latest Q read access requests in the read access counter;

$f'_4$ represents a proportion of the read access requests for the page among latest R read access requests in the read access counter;

$a_{21}$, $a_{22}$, $a_{23}$, $a_{24}$, and $a_{25}$ are weight parameters, and $a_{21}+a_{22}+a_{23}+a_{24}+a_{25}=1$; and calculating the access hotness value of the currently accessed memory page through the following formula: $Hot_{access}=Hot_{read}+Hot_{write}$.

The present application further provides a management apparatus for a hybrid memory system, which is configured to implement the foregoing management method for a hybrid memory system and includes:

a hotness value acquisition unit, configured to acquire a write hotness value and an access hotness value of a currently accessed memory page;

a write hotness page migration flag information generation unit, configured to compare the write hotness value with a specified write hotness threshold, and generate write hotness page migration flag information;

an access hotness page migration flag information generation unit, configured to compare the access hotness value with a specified access hotness threshold, and generate access hotness page migration flag information;

a hybrid memory grouping unit, configured to group a hybrid memory in the hybrid memory system, and generate memory page management information corresponding to the hybrid memory based on memory page information of all grouped memory banks; and a data migration unit, configured to determine whether the currently accessed memory page is a hot data page based on the write hotness page migration flag information, the access hotness page migration flag information, and current memory page management information corresponding to the currently accessed memory page, and perform data migration based on a preset cold and hot data page migration strategy.

The present application further provides a computer device, including a memory, a processor, and computer-readable instructions, the computer-readable instructions being stored in the memory and executable on the processor, and the processor, when executing the computer-readable instructions, implementing the steps of the foregoing management method for a hybrid memory system.

The present application further provides one or more non-volatile computer-readable storage media storing computer-readable instructions, the computer-readable instructions, when executed by one or more processors, enabling the one or more processors to implement the steps of the foregoing management method for a hybrid memory system.

The present application further provides a hybrid memory system, including a hybrid memory; and the hybrid memory being managed by the foregoing management method for a hybrid memory system.

BRIEF DESCRIPTION OF THE DRAWINGS

To illustrate the technical solutions in the embodiments of the present application more clearly, the accompanying drawings required in the description of the embodiments will be briefly introduced below. Apparently, the drawings in the following description show merely some embodiments of the present application, and a person of ordinary skill in the art may obtain other drawings from these drawings without any creative efforts.

FIG. 2 is a schematic diagram of flag bits of a memory address in one or more practical embodiments of the present application;

FIG. 3 is a schematic diagram of correspondence between different programs and specific physical addresses in 12-13 bits of a memory address in one or more practical embodiments of the present application;

FIG. 4 is a schematic diagram of a write access counter and a read access counter in one or more practical embodiments of the present application;

DETAILED DESCRIPTION

Figure 1:
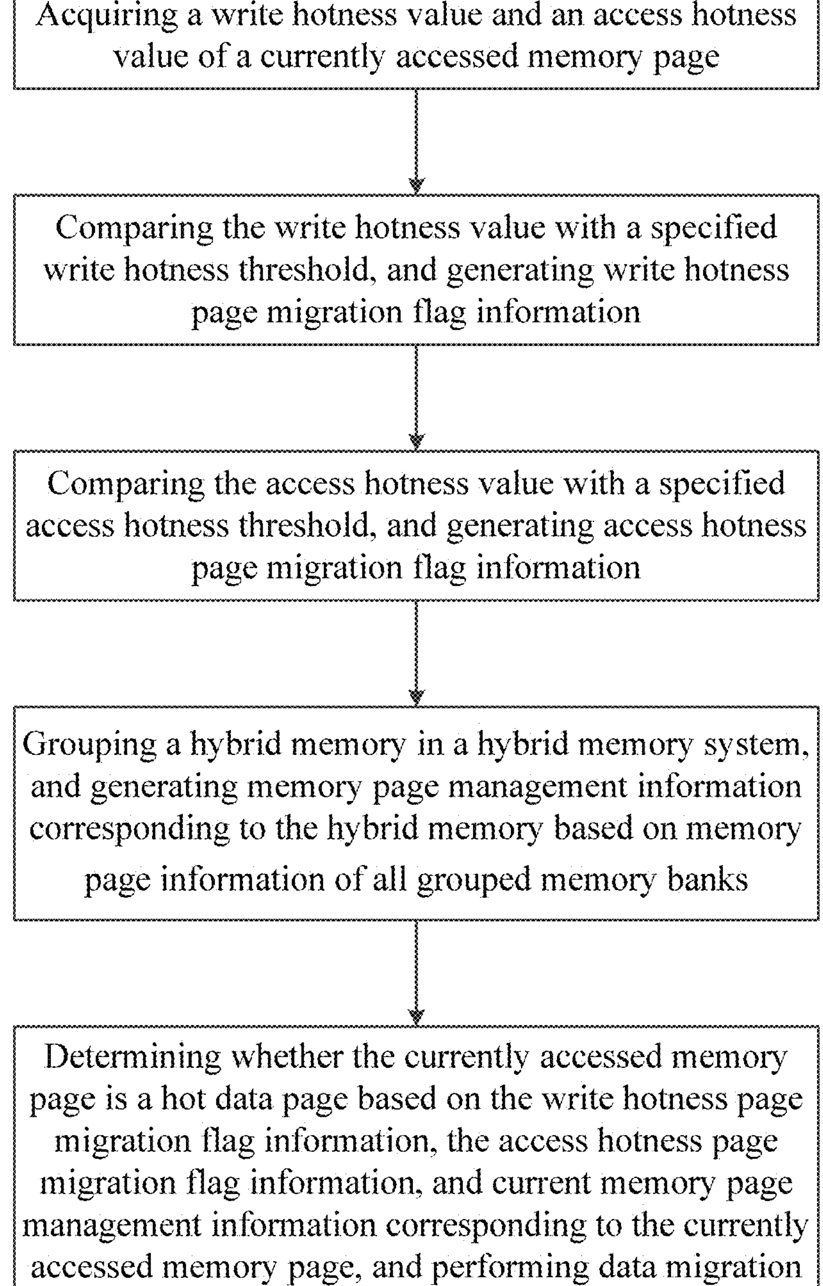
FIG. 1 is a schematic flowchart of a management method for a hybrid memory system in one or more first embodiments of the present application.

In the related art, to fully leverage the advantages of hybrid memory heterogeneous hardware, progresses have been made in hybrid memory storage technologies currently, such as accurately predicting access characteristics of memory data, migrating hot data to a DRAM based on the access characteristics, and storing cold data in a high-capacity NVM.

These research technologies propose some management strategies, such as dynamically monitoring a write operation of each memory page during runtime and migrating write-intensive pages from the NVM to the DRAM to reduce write latency; or improving conventional page migration algorithms, management strategies, and other mechanisms, and classifying pages based on page hotness to reduce the frequency of page migration.

However, the data processing rate of a CPU is much higher than the data output rate of a main memory system, and the response rate of a cache including static random access memories is greater than that of a main memory. The CPU reads data from the cache first, which can significantly improve system performance. Currently, most research merely focuses on improving performance from a hybrid memory, without considering the overall memory system, especially the linkage between the main memory and the cache. Due to the arbitrary mapping of virtual and real addresses of memories, the distribution of data blocks in the cache indexed by physical addresses is usually uneven, resulting in significant fluctuations in system performance.

That is, in the related art, the read and write of memories by an application program are dynamically changing. In the multi-core era, due to the concurrent execution of a plurality of programs, memory access requests issued by the programs compete on the cache, resulting in a decrease in cache hit rate, thereby reducing the overall performance of a computer. When the memory access requests of the plurality of programs fall on the same bank, memory access conflicts will occur on the bank, resulting in a decrease in line buffer hit rate and degradation in memory access performance, which also affect the overall performance of the system.

For example, the memory management mechanism of the Linux operating system employs a random physical page allocation mechanism. When a "page loss" occurs, a physical page is randomly selected from a partner system, and a virtual-real address mapping is established in a page table through the operating system. This uncertainty incurs random allocation of frequently accessed pages to the same physical memory bank (i.e., memory bank), resulting in access conflicts on the bank.

Meanwhile, in an on-chip cache, non-uniform data distribution across a cache set is highly likely to cause cache losses, which also affect system performance.

In a multi-core processor system, memory access requests from a plurality of computing units may incur conflicts and interferences on a memory system.

It can be seen that current research on a DRAM-NVM hybrid memory management architecture generally focuses on a main memory architecture, a hot page prediction method, and a page scheduling issue, but neglects the linkage between a main memory and a cache, and fails to consider the overall situation to further improve the performance of a hybrid memory.

Therefore, the present application provides a management method and management apparatus for a hybrid memory system, a device, and a medium, to solve the above problems.

In order to make the objectives, technical solutions, and advantages of the present application clearer, the technical solutions in the embodiments of the present application will be clearly and completely described in conjunction with the accompanying drawings therein. Apparently, the described embodiments are merely part of the embodiments of the present application, not all of them. All other embodiments obtained by those of ordinary skill in the art based on the embodiments of the present application without any creative efforts shall fall within the scope of protection of the present application.

First Embodiment

As shown in FIG. 1, an embodiment of the present application provides a management method for a hybrid memory system.

The management method includes:

acquiring a write hotness value and an access hotness value of a currently accessed memory page;

comparing the write hotness value with a specified write hotness threshold, and generating write hotness page migration flag information;

comparing the access hotness value with a specified access hotness threshold, and generating access hotness page migration flag information;

grouping a hybrid memory in the hybrid memory system, and generating memory page management information corresponding to the hybrid memory based on memory page information of all grouped memory banks; and determining whether the currently accessed memory page is a hot data page based on the write hotness page migration flag information, the access hotness page migration flag information, and current memory page management information corresponding to the currently accessed memory page, and performing data migration based on a preset cold and hot data page migration strategy.

The grouping a hybrid memory in the hybrid memory system, and generating memory page management information corresponding to the hybrid memory based on memory page information of all grouped memory banks includes:

dividing the hybrid memory in the hybrid memory system into a plurality of grouped memory banks based on a preset unified memory group capacity and a preset unified memory group memory ratio, and marshaling all the grouped memory banks, where each grouped memory bank includes at least one dynamic random access memory area and at least one non-volatile memory area, and the preset unified memory group memory ratio is a ratio of the dynamic random access memory area to the non-volatile memory area in each grouped memory bank;

generating a memory page management information table corresponding to the hybrid memory based on the memory page information of all the grouped memory banks, where the memory page management information table includes memory page attribute information, and the memory page attribute information includes grouped memory bank numbers, a lowest memory read-write attribute level, and a highest memory read-write attribute level; and acquiring program in the system and specified grouped memory banks corresponding to the programs, and generating a memory group mapping relationship based on program calibration information of memory programs and grouped memory bank numbers of specified grouped memory banks corresponding to the memory programs.

In practical embodiments, in the foregoing management method for a hybrid memory system, firstly, the hybrid memory is divided into the plurality of grouped memory banks based on the DRAM-NVM ratio;

Then, each group of hybrid memory is managed by pages, the memory page management information table is established to record the attributes of each page and the lowest memory read-write attribute level and highest memory read-write attribute level allocated from the current memory page; the attributes of the page include a memory group number, an NVM or DRAM type, a physical address range, and the like;

Next, an association between memory programs and memory groups is established. Each memory program only uses one group or specified groups of grouped memory banks, and there is a mapping relationship between a program and a memory group number used by the program; then, the hybrid memory is grouped to limit the memory accessed by the program to one or several grouped memory banks;

Therefore, access interference between programs can be eliminated, and line buffer locality of the programs can be ensured; one program can only access a memory group corresponding to the program, but cannot access the memories of other programs, thereby ensuring that the hybrid memory system is in an optimal performance state;

Meanwhile, hot data pages of memories are predicted and memory migration is performed through a hot and cold data page determination and migration method.

In practice, in the foregoing management method for a hybrid memory system, a cache linkage effect may be fully considered to group a DRAM-NVM memory and limit a program accessed memory to one or several memory banks; then a cache and hybrid memory address mapping rule is established to ensure that different program groups correspond to different cache groups; hot and cold data pages in the hybrid memory system are predicted in real time and migrated based on the memory groups; therefore, the optimal performance of the hybrid memory system is ensured.

In an implementation, the management method further includes:

acquiring a memory allocation request parameter corresponding to a current memory program, where the memory allocation request parameter includes a memory read-write attribute level parameter;

determining whether the memory read-write attribute level parameter reaches a preset read-write attribute level threshold; and if the memory read-write attribute level parameter reaches the preset read-write attribute level threshold, allocating a memory area in a specified grouped memory bank corresponding to the current memory program to the current memory program based on a first memory allocation principle, where the first memory allocation principle is: preferentially allocating the dynamic random access memory area, and allocating the non-volatile memory area when the dynamic random access memory area is insufficient; or if the memory read-write attribute level parameter does not reach the preset read-write attribute level threshold, allocating the memory area in the specified grouped memory bank corresponding to the current memory program to the current memory program based on a second memory allocation principle, where the second memory allocation principle is: preferentially allocating the non-volatile memory area, and allocating a write attribute memory area when the non-volatile memory area is insufficient.

In practical embodiments, when memory allocation is requested in an application program, the request parameter includes a memory size and a memory read-write attribute level.

The operating system allocates a DRAM or NVM of a physical memory group corresponding to the program based on the memory read-write attribute level. The operating system preferentially allocates a DRAM to an application with a higher memory read-write attribute level (greater than or equal to 5), or allocates an NVM type memory if the DRAM type memory is insufficient;

The operating system preferentially allocates an NVM to an application with a lower read-write attribute level (less than 5), or allocates a write attribute memory if the NVM type memory is insufficient.

In an implementation, the marshaling all the grouped memory banks includes: addressing all the grouped memory banks based on a preset addressing rule to generate grouped memory bank physical addresses corresponding to the grouped memory banks.

The management method further includes a cache address mapping method, including:

acquiring cache index bit information of cache slices in a cache, and allocating, to the cache slice at each specific cache index bit, hot data configured for saving a specific physical memory address; and generating a cache physical address mapping relationship based on the specific physical memory address and slice annotation information of the cache slices.

In an implementation, the generating a cache physical address mapping relationship includes:

querying a specific cache slice corresponding to the specific physical memory address based on memory index bit information in the specific physical memory address, where the memory index bit information matches cache slice numbers one by one;

when memory annotation bit information in the specific physical memory address matches slice annotation bit information in the specific cache slice, querying a corresponding specific cache channel from the specific cache slice based on the memory annotation bit information; and generating the cache physical address mapping relationship based on the specific physical memory address and information of the specific cache channel.

In practical embodiments, the cache address mapping method is configured for constructing an address mapping relationship between the hybrid memory and a last level cache (LLC) cached by the CPU.

Due to the fact that the index bit of a cache set is a specific bit, the operating system preferentially allocates a page of a specific physical address to an application program to store hot data. In the foregoing method of grouping application programs, the specific physical address is associated with the memory group number corresponding to the application program, so as to achieve isolation of hot data between different application program groups on the cache, reduce memory access competition caused by the plurality of programs on the cache, improve cache hit rates, and further improve the overall performance of the hybrid memory.

A cache may be subdivided into cache sets, with equal size. Each cache set may include a quantity of cache lines, and each cache line may include a data volume (such as 32 bytes, 64 bytes, or 128 bytes). Assuming a memory address has m bits, the middle s bit is configured for corresponding to the number of a cache set and specifying a cache set to index/search a cache; the low b bit corresponds to an offset of a byte in a cache line, while the high m-s-b bit represents a tag field segment.

When a cache corresponding to a memory address is searched, a corresponding cache set is found based on a value of an index field, and then a corresponding cache line is found based on the matching of a value of a tag field of the memory address with a value of tag in the cache.

In an implementation, the method further includes:

acquiring a current grouped memory bank corresponding to a current program based on the memory group mapping relationship, and acquiring a current grouped memory bank memory page physical address corresponding to the current grouped memory bank;

acquiring current memory annotation bit information corresponding to the current grouped memory bank memory page physical address, and selecting a specific current memory page based on the current memory annotation bit information; and allocating a dynamic random access memory page corresponding to the current memory page to a write-intensive data page of the current program; and allocating a non-volatile memory page corresponding to the current memory page to a read-intensive data page of the current program.

Accordingly, the distribution of data of different attributes among different memory types can be controlled, and mutual interferences of the plurality of programs in the memory system can be eliminated, thereby effectively improving the performance of the entire memory system.

In an implementation, the generating a memory group mapping relationship includes:

performing remainder calculation on program ID information of each memory program and a total number of memory groups in all the grouped memory banks, using remainder calculation results as grouped memory bank numbers that the memory programs are able to access, and dividing memory programs with the same remainder calculation result into one group.

In practical embodiments, there is a mapping relationship between a program and a memory group number used by the program; the memory group number that the program can access is a result of remainder calculation on program ID and the total number of memory groups; and the memory group number may alternatively be derived from other algorithms or manually allocated.

That is, the method of grouping application programs may involve remainder calculation between a program ID and a group number, and division of programs with the same calculation results into one group.

In an implementation, before acquiring a write hotness value and an access hotness value of a currently accessed memory page, the method further includes:

configuring corresponding high-frequency write access page linked lists and high-frequency access memory linked lists based on the information of the grouped memory banks.

In addition, based on the foregoing management method, the management method for a hybrid memory system may further dynamically predict the hotness of a data page based on information such as a number of read and write accesses to the hybrid memory, a number of read and write accesses of memory data in the cache, the lowest memory read-write attribute level and highest memory read-write attribute level saved on the page, and a memory access sequence, and perform memory page migration within the memory banks as needed.

As few DRAMs as possible are configured to absorb a write operation, hot data or a write intensive data page is swapped into a DRAM, and a memory data page with the highest write frequency is migrated to a DRAM of a specific address; cold data or a read-intensive data page is stored in a high-capacity NVM, and memory data with the highest read frequency is migrated to an NVM of a specific address; therefore, the synergistic advantages of the hybrid memory and the cache are further leveraged.

In an implementation, the performing data migration based on a preset cold and hot data page migration strategy includes:

when both the write hotness page migration flag information and the access hotness page migration flag information are set, if the currently accessed memory page does not belong to the dynamic random access memory area and a specific bit of a memory address corresponding to the currently accessed memory page does not conform to a specific value of a current running program, acquiring a dynamic random access memory area of the grouped memory bank where the currently accessed memory page is located, querying the dynamic random access memory area for an updated memory page with a memory address that meets program grouping requirements, and migrating data to the updated memory page.

In an implementation, the performing data migration based on a preset cold and hot data page migration strategy includes:

when the write hotness page migration flag information is set and the access hotness page migration flag information is not set, if the currently accessed memory page does not belong to the dynamic random access memory area, acquiring a dynamic random access memory area of the grouped memory bank where the currently accessed memory page is located, querying the dynamic random access memory area for an updated memory page with a memory address that meets program grouping requirements, and migrating data to the updated memory page.

In an implementation, the performing data migration based on a preset cold and hot data page migration strategy includes:

when the write hotness page migration flag information is not set, but the access hotness page migration flag information is set, if the lowest memory read-write attribute level allocated to the currently accessed memory page is greater than a preset lowest memory read-write attribute level threshold, determining whether the currently accessed memory page belongs to the dynamic random access memory area, and whether a specific bit of a memory address corresponding to the currently accessed memory page conforms to a specific value of a program group; and when at least one of the determinations does not meet requirements, acquiring a dynamic random access memory area of the grouped memory bank where the currently accessed memory page is located, querying the dynamic random access memory area for an updated memory page with a memory address that meets program grouping requirements, and migrating data to the updated memory page.

In an implementation, the performing data migration based on a preset cold and hot data page migration strategy includes:

when the write hotness page migration flag information is not set, but the access hotness page migration flag information is set, if the highest memory read-write attribute level allocated to the currently accessed memory page is greater than a preset highest memory read-write attribute level threshold, determining whether the currently accessed memory page belongs to the dynamic random access memory area, and whether a specific bit of a memory address corresponding to the currently accessed memory page conforms to a specific value of a program group; and when at least one of the determinations does not meet requirements, acquiring a dynamic random access memory area of the grouped memory bank where the currently accessed memory page is located, querying the dynamic random access memory area for an updated memory page with a memory address that meets program grouping requirements, and migrating data to the updated memory page.

In an implementation, the performing data migration based on a preset cold and hot data page migration strategy includes:

when both the write hotness page migration flag information and the access hotness page migration flag information are not set, keeping the currently accessed memory page unchanged.

Therefore, after the write hotness page migration flag information and the access hotness page migration flag information are read, the attribute information of the current memory page and the allocated lowest memory read-write attribute level and highest memory read-write attribute level are read from the memory management information and then determined one by one, and corresponding data migration processing is implemented.

In an implementation, the comparing the write hotness value with a specified write hotness threshold, and generating write hotness page migration flag information includes:

if the write hotness value is greater than the specified write hotness threshold and the currently accessed memory page is located in a high-frequency write access page linked list of a corresponding grouped memory bank, clearing a write hotness page migration flag, and generating the write hotness page migration flag information.

In an implementation, the comparing the write hotness value with a specified write hotness threshold, and generating write hotness page migration flag information includes:

if the write hotness value is greater than the specified write hotness threshold and the currently accessed memory page is not in a high-frequency write access page linked list of a corresponding grouped memory bank, determining whether a quantity of members in the high-frequency write access page linked list reaches a specified threshold; and if the quantity does not reach the specified threshold, setting a write hotness page migration flag, and generating the write hotness page migration flag information; or if the quantity reaches the specified threshold, comparing write access hotness values of all members in the high-frequency write access page linked list with the write hotness value corresponding to the currently accessed memory page; when the write hotness value is less than the write access hotness values, clearing the write hotness page migration flag, and generating the write hotness page migration flag information; or when the write hotness value is not less than the write access hotness values, setting the write hotness page migration flag, and generating the write hotness page migration flag information.

In an implementation, the comparing the write hotness value with a specified write hotness threshold, and generating write hotness page migration flag information includes:

if the write hotness value does not exceed the specified write hotness threshold, clearing a write hotness page migration flag and generating the write hotness page migration flag information.

In an implementation, the acquiring a write hotness value and an access hotness value of a currently accessed memory page includes:

$$\text{Hot}_{write} = a_{11}f_0 + a_{12}f_1 + a_{13}f_2 + a_{14}f_3 + a_{15}f_4,$$

where $f_0$ represents a proportion of write access requests for the page among M write access requests in a write access counter;

$f_1$ represents a proportion of the write access requests for the page among latest N write access requests in the write access counter;

$f_2$ represents a proportion of the write access requests for the page among latest P write access requests in the write access counter;

$f_3$ represents a proportion of the write access requests for the page among latest Q write access requests in the write access counter;

$f_4$ represents a proportion of the write access requests for the page among latest R write access requests in the write access counter;

$a_{11}$, $a_{12}$, $a_{13}$, $a_{14}$, and $a_{15}$ are weight parameters, and $a_{11}+a_{12}+a_{13}+a_{14}+a_{15}=1$;

calculating a read access hotness value of the currently accessed memory page through the following formula: $\text{Hot}_{read}=a_{21}f'_0+a_{22}f'_1+a_{23}f'_2+a_{24}f'_3+a_{25}f'_4$, where $f'_0$ represents a proportion of read access requests for the page among M read access requests in a read access counter;

$f'_1$ represents a proportion of the read access requests for the page among latest N read access requests in the read access counter;

$f'_2$ represents a proportion of the read access requests for the page among latest P read access requests in the read access counter;

$f'_3$ represents a proportion of the read access requests for the page among latest Q read access requests in the read access counter;

$f'_4$ represents a proportion of the read access requests for the page among latest R read access requests in the read access counter;

$a_{21}$, $a_{22}$, $a_{23}$, $a_{24}$, and $a_{25}$ are weight parameters, and $a_{21}+a_{22}+a_{23}+a_{24}+a_{25}=1$; and calculating the access hotness value of the currently accessed memory page through the following formula: $\text{Hot}_{access}=\text{Hot}_{read}+\text{Hot}_{write}$.

For example, the write hotness value of the currently accessed memory page is calculated through the following formula: $\text{Hot}_{write}=a_{11}f_{100}+a_{12}f_{50}+a_{13}f_{25}+a_{14}f_{10}+a_{15}f_5$, where $f_{100}$ represents a proportion of write access requests for the page among 100 write access requests in the write access counter;

$f_{50}$ represents a proportion of the write access requests for the page among latest 50 write access requests in the write access counter;

$f_{25}$ represents a proportion of the write access requests for the page among latest 25 write access requests in the write access counter;

$f_{10}$ represents a proportion of the write access requests for the page among latest 10 write access requests in the write access counter;

$f_5$ represents a proportion of the write access requests for the page among latest 5 write access requests in the write access counter;

$a_{11}$, $a_{12}$, $a_{13}$, $a_{14}$, and ais are weight parameters, and $a_{11}+a_{12}+a_{13}+a_{14}+a_{15=1}$;

the read access hotness value of the currently accessed memory page is calculated through the following formula: $\text{Hot}_{read}=a_{21}f'_{100}+a_{22}f'_{50}+a_{23}f'_{25}+a_{24}f'_{10}+a_{25}f'_5$, where $f'_{100}$ represents a proportion of read access requests for the page among 100 read access requests in the read access counter;

$f'_{50}$ represents a proportion of the read access requests for the page among latest 50 read access requests in the read access counter;

$f'_{25}$ represents a proportion of the read access requests for the page among latest 25 read access requests in the read access counter;

$f'_{10}$ represents a proportion of the read access requests for the page among latest 10 read access requests in the read access counter;

$f'_5$ represents a proportion of the read access requests for the page among latest 5 read access requests in the read access counter;

$a_{21}$, $a_{22}$, $a_{23}$, $a_{24}$, and $a_{25}$ are weight parameters, and $a_{21}+a_{22}+a_{23}+a_{24}+a_{25}=1$;

the access hotness value of the currently accessed memory page is calculated through the following formula: $\text{Hot}_{access}=\text{Hot}_{read}+\text{Hot}_{write}$.

Therefore, by comparing the write hotness value with the specified write hotness threshold, the write hotness page migration flag information may be generated;

Similarly, by comparing the access hotness value with the specified access hotness threshold, the access hotness page migration flag information may be generated.

In summary, the management method for a hybrid memory system, provided in the practical embodiments of the present application, can fully consider the correlation between memories and cache for the performance optimization issues of the DRAM-NVM hybrid memory system based on horizontal architecture. The overall method includes: a DRAM-NVM memory grouping method, a cache mapping rule, a memory request allocation method, as well as a method for determining a hot data page and a page migration method based on memory grouping, etc.

The management method can reduce conflicts and interferences on the memory system, accurately identify hot data, and migrate the hot data to a reasonable memory bank to ensure the optimal performance of the hybrid memory system.

A specific implementation process of the foregoing management method is as follows.

First Stage: Implement a DRAM-NVM Memory Grouping Method

Firstly, a DRAM-NVM hybrid memory is divided by banks and grouped in a DRAM-NVM ratio.

According to the hardware characteristics of memories, the DRAM-NVM hybrid memory is divided into a plurality of banks.

For example, an 8 GB memory is divided into 64 DRAM banks (each bank is 125 MB). The DRAM-NVM hybrid memory is uniformly addressed. The number, memory attribute, starting address, and ending address of each memory bank are recorded in a bank information table, where the memory banks are numbered 1, 2, 3 . . . N, and the memory attribute is NVM or DRAM.

Later, the memory is marshaled based on the DRAM-NVM ratio of the hybrid memory, where each group has one or more DRAM banks and one or more NVM banks, the size of each group of memory is the same, and the ratio of DRAM to NVM is also the same.

For example, a hybrid memory including 8 GB DRAM and 32 GB NVM is divided into 32 groups, each group including 2 DRAM banks and 8 NVM banks. Each group of hybrid memory is addressed based on a rule: a starting address of DRAM in the $i^{th}$ group of hybrid memory is (DRAM_BASE+i*BANK_SIZE*DRAM_BANK_NUM), with a size of BANK_SIZE*DRAM_BANK_NUM; a starting address of NVM in the $i^{th}$ group of hybrid memory is (NVM_BASE+i*BANK_SIZE*NVM_BANK_NUM), with a size of BANK_SIZE*NVM_BANK_NUM; where DRAM_BASE is a starting address of the hybrid memory DRAM, NVM_BASE is a starting address of the hybrid memory NVM, BANK_SIZE is a size of each bank memory, DRAM_BANK_NUM is a quantity of DRAM banks included in each group of hybrid memory, and NVM_BANK_NUM is a quantity of NVM banks included in each group of hybrid memory.

Then, each group of hybrid memory is managed by page, and a memory page management information table is established to record the attributes of each page and the lowest memory read-write attribute level and highest memory read-write attribute level allocated from the current memory page. The attributes of the page include information, such as memory bank number, NVM or DRAM type, and physical address range. The memory read-write attribute level is configured at 8 levels, ranging from 1 to 8. A higher level indicates a more frequent write operation.

Next, an association between an application program and a memory bank is established. Each application program only uses one group or specified groups of memory banks to eliminate access interference between programs and ensure line buffer locality of the program. The program can only access the memory bank corresponding to the program, and cannot access the memories of other programs.

Each group of hybrid memory includes DRAM and NVM, and there is a mapping relationship between a program and a memory group number used by the program; the memory group number that the program can access is a result of remainder calculation on program ID and the total number of memory groups; and the memory group number may alternatively be derived from other algorithms or manually allocated.

Second Stage: Implement a Memory Request Allocation Method

Then, when memory allocation is requested in an application program, the request parameter includes a memory size and a memory read-write attribute level.

The operating system allocates a DRAM or NVM of a physical memory group corresponding to the program based on the memory read-write attribute level. The operating system preferentially allocates a DRAM to an application with a higher memory read-write attribute level (greater than or equal to 5), or allocates an NVM type memory if the DRAM type memory is insufficient;

The operating system preferentially allocates an NVM to an application with a lower read-write attribute level (less than 5), or allocates a write attribute memory if the NVM type memory is insufficient.

After the memory allocation is completed, the memory page attribute information corresponding to the memory page management information table is updated, the memory page attribute information including the highest memory read-write attribute level and lowest memory read-write attribute level allocated to the page.

Third Stage: Establish a Cache Mapping Rule

Then, an address mapping relationship is constructed between the hybrid memory and a last level cache (LLC) cached by the CPU. Due to the fact that the index bit of a cache set is a specific bit, the operating system preferentially allocates a page of a specific physical address to an application program to store hot data. In the foregoing method of grouping application programs, the specific physical address is associated with the memory bank number corresponding to the application program, so as to achieve isolation of hot data between different application program groups on the cache, reduce memory access competition caused by the plurality of programs on the cache, improve cache hit rates, and further improve the overall performance of the hybrid memory.

A cache may be subdivided into cache sets, with equal size. Each cache set may include a quantity of cache lines, and each cache line may include a data volume (such as 32 bytes, 64 bytes, or 128 bytes).

As shown in FIG. 2, assuming a memory address has m bits, the middle s bit is configured for corresponding to the number of a cache set and specifying a cache set to index/search a cache; the low b bit corresponds to an offset of a byte in a cache line, while the high m-s-b bit represents a tag field segment.

When a cache corresponding to a memory address is searched, a corresponding cache set is found based on a value of an index field, and then a corresponding cache line is found based on the matching of a value of a tag field of the memory address with a value of tag in the cache.

In the foregoing method, the method of grouping application programs may involve remainder calculation between a program ID and a group number, and division of programs with the same calculation results into one group.

For example, as shown in FIG. 3, bits 12-18 of a memory address serve as cache Set index bits; the $12^{th}$ and $13^{th}$ bits of the memory address are used for grouping, 4 groups in total; programs are also divided into 4 groups; when a program requests a memory, a memory page with a specific value of a physical address ranging from 12 to 13 bits in the memory bank corresponding to the program is preferentially allocated to the program;

A DRAM page with a 12-13-bit physical address of 00 is allocated to a write-intensive data page of a first group of programs as much as possible, and an NVM page with a 12-13-bit address of 00 is allocated to a read-intensive data page of the first group of programs as much as possible;

A DRAM page with a 12-13-bit address of 01 is allocated to a write-intensive data page of a second group of programs as much as possible, and an NVM page with a 12-13-bit address of 01 is allocated to a read-intensive data page of the second group of programs as much as possible;

A DRAM page with a 12-13-bit address of 10 is allocated to a write-intensive data page of a third group of programs as much as possible, and an NVM page with a 12-13-bit address of 10 is allocated to a read-intensive data page of the third group of programs as much as possible;

A DRAM page with a 12-13-bit physical address of 11 is allocated to a write-intensive data page of a fourth group of programs as much as possible, and an NVM page with a 12-13-bit address of 11 is allocated to a read-intensive data page of the fourth group of programs as much as possible.

The above method can control the distribution of data of different attributes among different memory types, and eliminate mutual interferences of the plurality of programs in the memory system, thereby effectively improving the performance of the entire memory system.

Fourth Stage: Implement a Method for Determining a Hot Data Page and a Page Migration Method Based on Memory Grouping Based on the foregoing management method, the management method for a hybrid memory system may further dynamically predict the hotness of a data page based on information such as a number of read and write accesses to the hybrid memory, a number of read and write accesses of memory data in the cache, the lowest memory read-write attribute level and highest memory read-write attribute level saved on the page, and a memory access sequence, and perform memory page migration within the memory banks as needed.

As few DRAMs as possible are configured to absorb a write operation, hot data or a write intensive data page is swapped into a DRAM, and a memory data page with the highest write frequency is migrated to a DRAM of a specific address; cold data or a read intensive data page is stored in a high-capacity NVM, and memory data with the highest read frequency is migrated to an NVM of a specific address; therefore, the synergistic advantages of the hybrid memory and the cache are further leveraged.

A specific implementation process is as follows.

Firstly, as shown in FIG. 4, a write access counter and a read access counter are configured for each memory bank; the write access counter records last 100 write request accesses in chronological order of write accesses, while the read access counter records last 100 read request accesses in chronological order of read accesses, where the write access request includes access to the cache of the address, while the read access request includes access to the cache of the address.

Next, a high-frequency write access page linked list and a high-frequency access memory linked list are configured for each memory bank, where the linked list is configured for recording a page number and a current write hotness value and access hotness value of the page.

For the currently accessed memory page, a write hotness value, a read hotness value, and an access hotness value of the currently accessed memory page are calculated and stored in a memory page management information table.

Firstly, the write hotness value of the memory page may be calculated through the following formula: $Hot_{write}=a_{11}f_{100}+a_{12}f_{50}+a_{13}f_{25}+a_{14}f_{10}+a_{15}f_{5}$, where $f_{100}$ represents a proportion of write access requests for the page among 100 write access requests in the write access counter;

$f_{50}$ represents a proportion of the write access requests for the page among latest 50 write access requests in the write access counter;

$f_{25}$ represents a proportion of the write access requests for the page among latest 25 write access requests in the write access counter;

$f_{10}$ represents a proportion of the write access requests for the page among latest 10 write access requests in the write access counter;

$f_5$ represents a proportion of the write access requests for the page among latest 5 write access requests in the write access counter;

$a_{11}$, $a_{12}$, $a_{13}$, $a_{14}$, and ais are weight parameters, and $a_{11}+a_{12}+a_{13}+a_{14}+a_{15}=1$. Here, the weight parameters are 0.1, 0.1, 0.2, 0.3, and 0.3.

Secondly, the read access hotness value of the memory page is calculated through the following formula: $Hot_{read}=a_{21}f'_{100}+a_{22}f'_{50}+a_{23}f'_{25}+a_{24}f'_{10}+a_{25}f'_{5}$, where $f'_{100}$ represents a proportion of read access requests for the page among 100 read access requests in the read access counter;

$f'_{50}$ represents a proportion of the read access requests for the page among latest 50 read access requests in the read access counter;

$f'_{25}$ represents a proportion of the read access requests for the page among latest 25 read access requests in the read access counter;

$f'_{10}$ represents a proportion of the read access requests for the page among latest 10 read access requests in the read access counter;

$f'_5$ represents a proportion of the read access requests for the page among latest 5 read access requests in the read access counter;

$a_{21}$, $a_{22}$, $a_{23}$, $a_{24}$, and $a_{25}$ are weight parameters, and $a_{21}+a_{22}+a_{23}+a_{24}+a_{25}=1$. Here, the weight parameters are 0.1, 0.1, 0.2, 0.3, and 0.3.

Finally, the access hotness value of the memory page may be calculated through the following formula: $Hot_{access}=Hot_{read}+Hot_{write}$. Then, the write hotness value of the currently accessed memory page is compared and processed with the specified threshold $TH_{write}$. Specific steps are as follows.

Step 1) If the write hotness value of the currently accessed memory page is greater than the specified threshold $TH_{write}$ and the current memory is in the high-frequency write access linked list of the bank, the write hotness value of the page in the high-frequency write access linked list is updated, and a page migration flag $Flag_{write}$ is cleared.

Step 2) If the write hotness value of the currently accessed memory page is greater than the specified threshold $TH_{write}$ and the memory is not in the high-frequency write access page linked list of the memory bank:

if the quantity of members in the linked list does not reach a specified limit, the page migration flag $Flag_{write}$ is set, at the same time, the page number of the memory page is recorded as an immigration memory page number, and an emigration page is empty;

if the quantity of members in the linked list reaches the specified limit, write access hotness values of all the members in the high-frequency write access linked list are calculated and then compared;

if the write hotness value of the memory page is less than the write access hotness values of all the members, the page migration flag $Flag_{write}$ is cleared;

otherwise, the page migration flag $Flag_{write}$ is set, the page number of the memory page is recorded as an immigration memory page number, and the page with a minimum write hotness value is recorded as the emigration memory page.

Step 3) If the write hotness value of the currently accessed memory page is less than or equal to the specified threshold $TH_{write}$, the $Flag_{write}$ is cleared, and no processing is performed.

Then, the access hotness value of the currently accessed memory page is compared and processed with the specified threshold $TH_{access}$. Specific steps are as follows.

Step 1) If the access hotness value of the currently accessed memory page is greater than the specified threshold $TH_{access}$ and the memory is in the high-frequency access page linked list of the memory bank where the memory is located, the access hotness value of the page in the high-frequency access page linked list is updated, and a page migration flag $Flag_{access}$ is cleared.

Step 2) If the access hotness value of the currently accessed memory page is greater than the specified threshold $TH_{access}$ and the memory is not in the high-frequency access page linked list of the memory bank:

if the quantity of members in the linked list does not reach a specified limit, the page migration flag $Flag_{access}$ is set, at the same time, the page number of the memory page is recorded as an immigration memory page number, and an emigration page is empty;

if the quantity of members in the linked list reaches the specified limit, access hotness values of all the members in the high-frequency access linked list are calculated and then compared;

if the access hotness value of the memory page is less than the access hotness values of all the members, the page migration flag $Flag_{access}$ is cleared; otherwise, the page migration flag $Flag_{access}$ is set, the page number of the memory page is recorded as an immigration memory page number, and the page with a minimum access hotness value is recorded as the emigration memory page.

Step 3) If the access hotness value of the currently accessed memory page is less than the specified threshold $TH_{access}$, the page migration flag $Flag_{access}$ is cleared, and no processing is performed.

Next, whether the current page is a hot page and a migration strategy are determined based on the $Flag_{write}$, the $Flag_{access}$, and the management information of the current memory page.

The statuses of the $Flag_{write}$ and the $Flag_{access}$ are read, the attribute information of the current memory page and the allocated lowest memory read-write attribute level and highest memory read-write attribute level are read from the memory management information, and the following determinations are performed:

Determination 1: When both the $Flag_{write}$ and the j$Flag_{access}$ are set, if the memory page does not belong to the DRAM and the specific bit of the memory address does not match the specific value of the program group, a memory page with a memory address that meets the requirements of the program group is searched from the DRAM of the memory bank, data is migrated to that page, and then virtual-real address remapping is performed; and the changed memory page information is updated to the memory management information.

Meanwhile, the new page information is updated to the high-frequency write access linked list and the high-frequency access linked list, and the read access counter and the write access counter are updated; otherwise, no processing is performed.

Determination 2: When the $Flag_{write}$ is set and the $Flag_{access}$ is not set, if the memory page does not belong to any DRAM, a memory page is searched from the DRAM of the memory bank, data is migrated to that page, and then virtual-real address remapping is performed; and the changed memory page information is updated to the memory management information.

Meanwhile, the new page information is updated to the high-frequency write access linked list, and the read access counter and the write access counter are updated; otherwise, no processing is performed.

Determination 3: When the $Flag_{write}$ is not set and the $Flag_{access}$ is set, if the lowest memory read-write attribute level allocated for the memory page is greater than 4, whether the memory page belongs to any DRAM and whether the specific bit of the memory address matches the specific value of the program group are determined; If the memory page belongs to a DRAM and the specific bit matches the specific value, no processing is performed.

Otherwise, a memory page with a memory address that meets the requirements of the program group is searched from the DRAM of the memory bank, data is migrated to that page, then virtual-real address remapping is performed, and the changed memory page information is updated to the memory management information; at the same time, the new page information is updated to the high-frequency write access linked list and the high-frequency access linked list, and the read access counter and the write access counter are updated.

If the highest memory read-write attribute level allocated for the memory page is less than 5, whether the memory page belongs to any NVM and whether the specific bit of the memory address matches the specific value of the program group are determined;

If the memory page belongs to an NVM and the specific bit matches the specific value, no processing is performed.

Otherwise, a memory page with a memory address that meets the requirements of the program group is searched from the DRAM of the memory bank, data is migrated to that page, then virtual-real address remapping is performed, the changed memory page information is updated to the memory management information, the new page information is updated to the high-frequency write access linked list and the high-frequency access linked list, and the read access counter and the write access counter are updated.

Other situations will not be handled.

Determination 4: When both the $Flag_{write}$ and the $Flag_{access}$ are not set, no processing is performed.

In summary, the foregoing management method for a hybrid memory system includes: a DRAM-NVM memory grouping method, a cache mapping rule, a memory request allocation method, as well as a method for determining a hot data page and a page migration method based on memory grouping, etc.

The overall management method can address the performance optimization problem of a DRAM-NVM hybrid memory system based on horizontal architecture, and fully considers a correlation between a memory and a cache.

Therefore, conflicts and interferences on the memory system can be reduced, hot data can be accurately identified and migrated to a reasonable memory bank to ensure optimal performance of the hybrid memory system.

It should be noted that, although the steps in the flowcharts are displayed in order indicated by arrows, these steps are not necessarily performed in the order indicated by the arrows. Unless otherwise explicitly specified herein, these steps are not limited in a strict sequence, but may be performed in other sequences. Moreover, at least some of the steps in the flowcharts may include a plurality of sub-steps or stages. These sub-steps or stages are not necessarily completed at the same time, but may be performed at different time. These sub-steps or stages are not necessarily performed in order, but may be alternated with at least some of other steps or sub-steps or stages of other steps.

Second Embodiment

Figure 5:
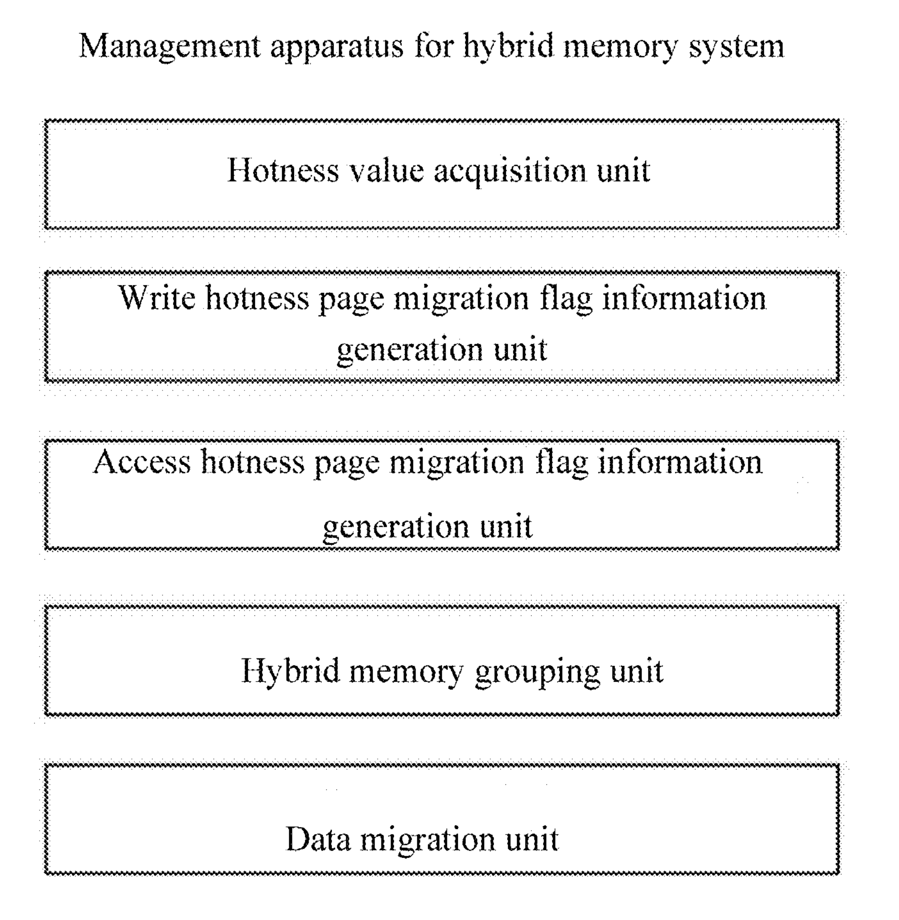
FIG. 5 is a structural block diagram of a management apparatus for a hybrid memory system in one or more second embodiments of the present application.

As shown in FIG. 5, an embodiment of the present application further provides a management apparatus for a hybrid memory system, which is configured to implement the foregoing management method for a hybrid memory system and includes:

a hotness value acquisition unit, configured to acquire a write hotness value and an access hotness value of a currently accessed memory page;

a write hotness page migration flag information generation unit, configured to compare the write hotness value with a specified write hotness threshold, and generate write hotness page migration flag information;

an access hotness page migration flag information generation unit, configured to compare the access hotness value with a specified access hotness threshold, and generate access hotness page migration flag information;

a hybrid memory grouping unit, configured to group a hybrid memory in the hybrid memory system, and generate memory page management information corresponding to the hybrid memory based on memory page information of all grouped memory banks; and a data migration unit, configured to determine whether the currently accessed memory page is a hot data page based on the write hotness page migration flag information, the access hotness page migration flag information, and current memory page management information corresponding to the currently accessed memory page, and perform data migration based on a preset cold and hot data page migration strategy.

In an implementation, the hybrid memory grouping unit includes:

a grouped memory bank division unit, configured to divide the hybrid memory in the hybrid memory system into a plurality of grouped memory banks based on a preset unified memory group capacity and a preset unified memory group memory ratio, and marshal all the grouped memory banks, where each grouped memory bank includes at least one dynamic random access memory area and at least one non-volatile memory area, and the preset unified memory group memory ratio is a ratio of the dynamic random access memory area to the non-volatile memory area in each grouped memory bank;

a memory page management information table generation unit, configured to generate a memory page management information table corresponding to the hybrid memory based on the memory page information of all the grouped memory banks, where the memory page management information table includes memory page attribute information, and the memory page attribute information includes grouped memory bank numbers, a lowest memory read-write attribute level, and a highest memory read-write attribute level; and a memory group mapping relationship generation unit, configured to acquire programs in the system and specified grouped memory banks corresponding to the programs, and generate a memory group mapping relationship based on program calibration information of the memory programs and grouped memory bank numbers of specified grouped memory banks corresponding to the memory programs.

In an implementation, the management apparatus further includes a memory allocation request unit, which is configured to:

acquire a memory allocation request parameter corresponding to a current memory program, where the memory allocation request parameter includes a memory read-write attribute level parameter;

determine whether the memory read-write attribute level parameter reaches a preset read-write attribute level threshold; and if the memory read-write attribute level parameter reaches the preset read-write attribute level threshold, allocate a memory area in a specified grouped memory bank corresponding to the current memory program to the current memory program based on a first memory allocation principle, where the first memory allocation principle is: preferentially allocating the dynamic random access memory area, and allocating the non-volatile memory area when the dynamic random access memory area is insufficient; or if the memory read-write attribute level parameter does not reach the preset read-write attribute level threshold, allocate the memory area in the specified grouped memory bank corresponding to the current memory program to the current memory program based on a second memory allocation principle, where the second memory allocation principle is: preferentially allocating the non-volatile memory area, and allocating a write attribute memory area when the non-volatile memory area is insufficient.

In an implementation, the grouped memory bank division unit is further configured to:

address all the grouped memory banks based on a preset addressing rule to generate grouped memory bank physical address corresponding to the grouped memory banks;

the management apparatus further includes a cache address mapping unit, which is configured to:

a specific physical memory address allocation unit, configured to acquire cache index bit information of cache slices in a cache, and allocate, to the cache slice at each specific cache index bit, hot data configured for saving a specific physical memory address; and a cache physical address mapping relationship generation unit, configured to generate a cache physical address mapping relationship based on the specific physical memory address and slice annotation information of the cache slices.

In an implementation, the cache physical address mapping relationship generation unit is further configured to:

query a specific cache slice corresponding to the specific physical memory address based on memory index bit information in the specific physical memory address, where the memory index bit information matches cache slice numbers one by one;

when memory annotation bit information in the specific physical memory address matches slice annotation bit information in the specific cache slice, query a corresponding specific cache channel from the specific cache slice based on the memory annotation bit information; and generate the cache physical address mapping relationship based on the specific physical memory address and information of the specific cache channel.

In an implementation, the memory allocation request unit is further configured to:

acquire a current grouped memory bank corresponding to a current program based on the memory group mapping relationship, and acquire a current grouped memory bank memory page physical address corresponding to the current grouped memory bank;

acquire current memory annotation bit information corresponding to the current grouped memory bank memory page physical address, and select a specific current memory page based on the current memory annotation bit information; and allocate a dynamic random access memory page corresponding to the current memory page to a write-intensive data page of the current program; and allocate a non-volatile memory page corresponding to the current memory page to a read-intensive data page of the current program.

In an implementation, the memory group mapping relationship generation unit is further configured to:

perform remainder calculation on program ID information of each memory program and a total number of memory groups in all the grouped memory banks, use remainder calculation results as grouped memory bank numbers that the memory programs are able to access, and divide memory programs with the same remainder calculation result into one group.

In an implementation, the data migration unit is further configured to:

when both the write hotness page migration flag information and the access hotness page migration flag information are set, if the currently accessed memory page does not belong to the dynamic random access memory area and a specific bit of a memory address corresponding to the currently accessed memory page does not conform to a specific value of a current running program, acquire a dynamic random access memory area of the grouped memory bank where the currently accessed memory page is located, query the dynamic random access memory area for an updated memory page with a memory address that meets program grouping requirements, and migrate data to the updated memory page.

In an implementation, the data migration unit is further configured to:

when the write hotness page migration flag information is set and the access hotness page migration flag information is not set, if the currently accessed memory page does not belong to the dynamic random access memory area, acquire a dynamic random access memory area of the grouped memory bank where the currently accessed memory page is located, query the dynamic random access memory area for an updated memory page with a memory address that meets program grouping requirements, and migrate data to the updated memory page.

In an implementation, the data migration unit is further configured to:

when the write hotness page migration flag information is not set, but the access hotness page migration flag information is set, if the lowest memory read-write attribute level allocated to the currently accessed memory page is greater than a preset lowest memory read-write attribute level threshold, determine whether the currently accessed memory page belongs to the dynamic random access memory area, and whether a specific bit of a memory address corresponding to the currently accessed memory page conforms to a specific value of a program group; and when at least one of the determinations does not meet requirements, acquire a dynamic random access memory area of the grouped memory bank where the currently accessed memory page is located, query the dynamic random access memory area for an updated memory page with a memory address that meets program grouping requirements, and migrate data to the updated memory page.

In an implementation, the data migration unit is further configured to:

when the write hotness page migration flag information is not set, but the access hotness page migration flag information is set, if the highest memory read-write attribute level allocated to the currently accessed memory page is greater than a preset highest memory read-write attribute level threshold, determine whether the currently accessed memory page belongs to the dynamic random access memory area, and whether a specific bit of a memory address corresponding to the currently accessed memory page conforms to a specific value of a program group; and when at least one of the determinations does not meet requirements, acquire a dynamic random access memory area of the grouped memory bank where the currently accessed memory page is located, query the dynamic random access memory area for an updated memory page with a memory address that meets program grouping requirements, and migrate data to the updated memory page.

In an implementation, the data migration unit is further configured to:

when both the write hotness page migration flag information and the access hotness page migration flag information are not set, keep the currently accessed memory page unchanged.

In an implementation, the hotness value acquisition unit is further configured to:

configure corresponding high-frequency write access page linked lists and high-frequency access memory linked lists based on the information of the grouped memory banks.

In an implementation, the write hotness page migration flag information generation unit is further configured to:

if the write hotness value is greater than the specified write hotness threshold and the currently accessed memory page is located in a high-frequency write access page linked list of a corresponding grouped memory bank, clear a write hotness page migration flag, and generate the write hotness page migration flag information.

In an implementation, the write hotness page migration flag information generation unit is further configured to:

if the write hotness value is greater than the specified write hotness threshold and the currently accessed memory page is not in a high-frequency write access page linked list of a corresponding grouped memory bank, determine whether a quantity of members in the high-frequency write access page linked list reaches a specified threshold; and if the quantity does not reach the specified threshold, set a write hotness page migration flag, and generate the write hotness page migration flag information; or if the quantity reaches the specified threshold, compare write access hotness values of all members in the high-frequency write access page linked list with the write hotness value corresponding to the currently accessed memory page; when the write hotness value is less than the write access hotness values, clear the write hotness page migration flag, and generate the write hotness page migration flag information; or when the write hotness value is not less than the write access hotness values, set the write hotness page migration flag, and generate the write hotness page migration flag information.

In an implementation, the write hotness page migration flag information generation unit is further configured to:

if the write hotness value does not exceed the specified write hotness threshold, clear a write hotness page migration flag, and generate the write hotness page migration flag information.

In an implementation, the hotness value acquisition unit is further configured to: calculate the write hotness value of the currently accessed memory page through the following formula: $Hot_{write}=a_{11}f_0+a_{12}f_1+a_{13}f_2+a_{14}f_3+a_{15}f_4$, where $f_0$ represents a proportion of write access requests for the page among M write access requests in a write access counter;

$f_1$ represents a proportion of write access requests for the page among latest N write access requests in the write access counter;

$f_2$ represents a proportion of the write access requests for the page among latest P write access requests in the write access counter;

$f_3$ represents a proportion of the write access requests for the page among latest Q write access requests in the write access counter;

$f_4$ represents a proportion of the write access requests for the page among latest R write access requests in the write access counter;

$a_{11}$, $a_{12}$, $a_{13}$, $a_{14}$, and $a_{15}$ are weight parameters, and $a_{11}+a_{12}+a_{13}+a_{14}+a_{15}=1$;

calculate a read access hotness value of the currently accessed memory page through the following formula: $Hot_{read}=a_2f'_0+a_{22}f'_1+a_{23}f''_2+a_{24}f'_3+a_{25}f'_4$, where $f'_0$ represents a proportion of read access requests for the page among M read access requests in a read access counter;

$f'_1$ represents a proportion of the read access requests for the page among latest N read access requests in the read access counter;

$f'_2$ represents a proportion of the read access requests for the page among latest P read access requests in the read access counter;

$f'_3$ represents a proportion of the read access requests for the page among latest Q read access requests in the read access counter;

$f'_4$ represents a proportion of the read access requests for the page among latest R read access requests in the read access counter;

$a_{21}$, $a_{22}$, $a_{23}$, $a_{24}$, and $a_{25}$ are weight parameters, and $a_{21}+a_{22}+a_{23}+a_{24}+a_{25}=1$; and calculate the access hotness value of the currently accessed memory page through the following formula: $Hot_{access}=Hot_{read}+Hot_{write}$.

In practical embodiments, the foregoing management apparatus for a hybrid memory system may include a memory management module, a memory allocation module, a program grouping module, a memory access statistics module, a memory access hotness value calculation module, and a memory determination migration module.

The memory management module is mainly configured to manage the hybrid memory by page, and record the information, attributes, and memory grouping relationship of each page of memories; the memory allocation module is mainly configured for memory requesting and allocation for a program to select an appropriate memory from the hybrid memory based on a request parameter and allocate the memory to the program; the program grouping module is mainly configured to group application programs to reduce conflicts among the different application programs in the cache; the memory access statistics module is mainly configured to record data of last 100 write access requests and 100 read access requests; the memory access hotness value calculation module is mainly configured to calculate write access hotness values and access hotness values of the current page and the pages in the high-frequency access page linked list and the high-frequency write access page linked list based on algorithms; and the memory determination migration module is mainly configured to determine, based on the foregoing algorithms, whether the current page needs to be migrated, and perform migration related operations.

Specific limitations of the foregoing apparatus may refer to the limitations of the method mentioned above, and will not be repeated here.

The various modules in the foregoing apparatus may be fully or partially implemented through software, hardware, or a combination thereof. The modules may be embedded in a hardware form or independent of a processor in a computer device, or stored in a software form in a memory of the computer device, whereby the processor calls the modules to perform operations according to the above modules.

Figure 6:
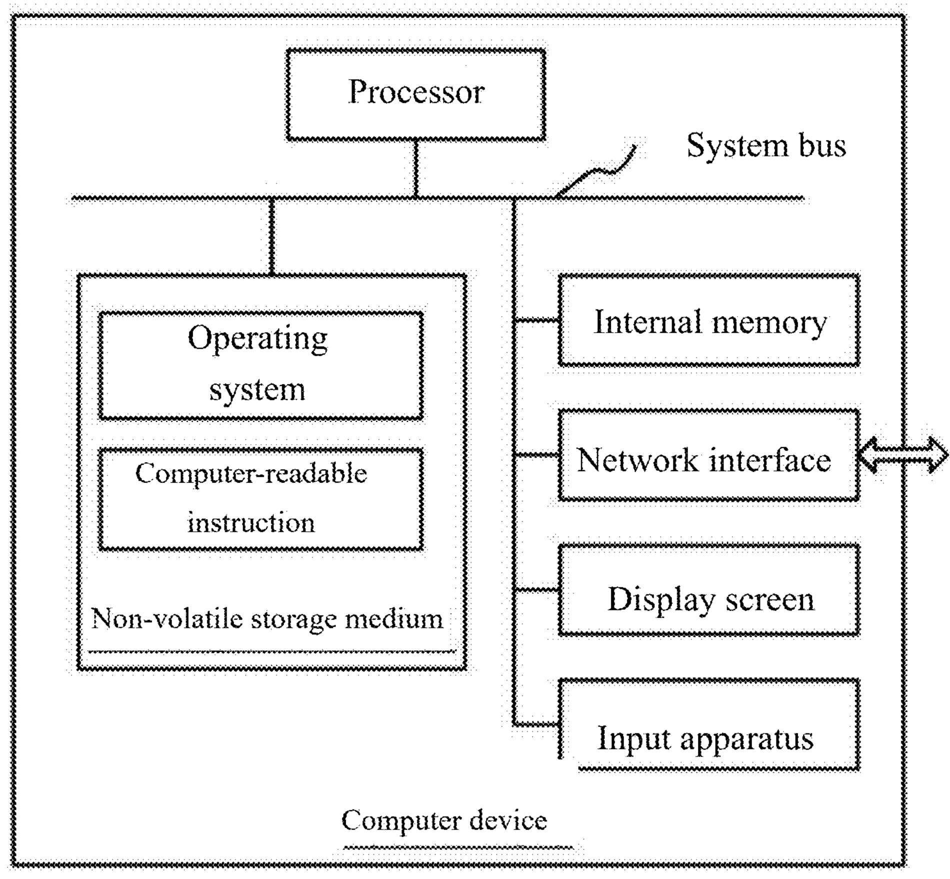
FIG. 6 is an internal structural diagram of a computer device in one or more second embodiments of the present application.

As shown in FIG. 6, the computer device may be a terminal, including a processor, a memory, a network interface, a display screen, and an input apparatus connected through a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The network interface of the computer device is configured to communicate with an external terminal through a network connection. The display screen of the computer device may be a liquid crystal display screen or an electronic ink display screen. The input apparatus of the computer device may be a touch layer covering the display, or may be a button, a trackball, or a touchpad disposed on a housing of the computer device, or may be an external keyboard, an external touchpad, a mouse, or the like.

It can be understood that the structure shown in the above figure is only a block diagram of a partial structure related to the present application, and does not constitute a limitation on the computer device to which the present application is applied. A specific computer device may include more or fewer components than shown in the figure, or combine some components, or have different component arrangements.

The implementation of all or part of the processes in the foregoing method embodiments may be accomplished by computer-readable instructions instructing relevant hardware. The computer-readable instructions may be stored in a non-volatile computer-readable storage medium. The computer-readable instructions, when executed, may include the processes of the method embodiments.

Any reference to the memory, storage, database, or other media used in the embodiments provided in the present application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an explanation rather than limitation, the RAM may be obtained in many forms, such as static RAM (SRAM), dynamic RAM (DRAM), synchronous DRAM (SDRAM), dual data rate SDRAM (DDRSDRAM), enhanced SDRAM (ESDRAM), synchlink DRAM (SLDRAM), rambus direct RAM (RDRAM), direct rambus dynamic RAM (DRDRAM), and rambus dynamic RAM (RDRAM).

It should be noted that the above are merely the embodiments of the present application and the technical principles applied. A person skilled in the art could understand that the present application is not limited to the specific embodiments herein. For the person skilled in the art, various obvious changes, readjustments, and substitutions can be made without departing from the scope of protection of the present application. Therefore, although the present application is described in detail through the above embodiments, the present application is not limited to the above embodiments, and may further include more other equivalent embodiments without departing from the concept of the present application. The scope of the present application is determined by the scope of the appended claims.

What is claimed is:

1. A management method for a hybrid memory system, comprising:

acquiring a write hotness value and an access hotness value of a currently accessed memory page;

comparing the write hotness value with a specified write hotness threshold, and generating write hotness page migration flag information;

comparing the access hotness value with a specified access hotness threshold, and generating access hotness page migration flag information;

grouping a hybrid memory in the hybrid memory system, and generating memory page management information corresponding to the hybrid memory based on memory page information of all grouped memory banks; and determining whether the currently accessed memory page is a hot data page based on the write hotness page migration flag information, the access hotness page migration flag information, and current memory page management information corresponding to the currently accessed memory page, and performing data migration based on a preset cold and hot data page migration strategy;

wherein the grouping a hybrid memory in the hybrid memory system, and generating memory page management information corresponding to the hybrid memory based on memory page information of all grouped memory banks comprises:

dividing the hybrid memory in the hybrid memory system into a plurality of grouped memory banks based on a preset unified memory group capacity and a preset unified memory group memory ratio, and marshaling all the grouped memory banks;

generating the memory page management information corresponding to the hybrid memory based on the memory page information of all the grouped memory banks; and acquiring programs in the system and specified grouped memory banks corresponding to the programs, and generating a memory group mapping relationship based on program calibration information of memory programs and grouped memory bank numbers of specified grouped memory banks corresponding to the memory programs.

2. The management method for a hybrid memory system according to claim 1, wherein each grouped memory bank comprises at least one dynamic random access memory area and at least one non-volatile memory area, and the preset unified memory group memory ratio is a ratio of the dynamic random access memory area to the non-volatile memory area in each grouped memory bank;

wherein the memory page management information comprises memory page attribute information, and the memory page attribute information comprises grouped memory bank numbers, a lowest memory read-write attribute level, and a highest memory read-write attribute level.

3. The management method for a hybrid memory system according to claim 2, wherein the management method further comprises:

acquiring a memory allocation request parameter corresponding to a current memory program, wherein the memory allocation request parameter comprises a memory read-write attribute level parameter;

determining whether the memory read-write attribute level parameter reaches a preset read-write attribute level threshold;

in response to the memory read-write attribute level parameter reaching the preset read-write attribute level threshold, allocating a memory area in a specified grouped memory bank corresponding to the current memory program to the current memory program based on a first memory allocation principle, wherein the first memory allocation principle is: preferentially allocating the dynamic random access memory area, and allocating the non-volatile memory area when the dynamic random access memory area is insufficient; and in response to the memory read-write attribute level parameter not reaching the preset read-write attribute level threshold, allocating the memory area in the specified grouped memory bank corresponding to the current memory program to the current memory program based on a second memory allocation principle, wherein the second memory allocation principle is: preferentially allocating the non-volatile memory area, and allocating a write attribute memory area when the non-volatile memory area is insufficient.

4. The management method for a hybrid memory system according to claim 2, that wherein the marshaling all the grouped memory banks comprises:

addressing all the grouped memory banks based on a preset addressing rule to generate grouped memory bank physical addresses corresponding to the grouped memory banks;

the management method further comprises:

acquiring cache index bit information of cache slices in a cache, and allocating, to a cache slice of the cache slices at each specific cache index bit, hot data configured for saving a specific physical memory address; and generating a cache physical address mapping relationship based on the specific physical memory address and slice annotation information of the cache slices.

5. The management method for a hybrid memory system according to claim 4, wherein the generating a cache physical address mapping relationship comprises:

querying a specific cache slice corresponding to the specific physical memory address based on memory index bit information in the specific physical memory address, wherein the memory index bit information matches cache slice numbers one by one;

in response to memory annotation bit information in the specific physical memory address matching slice annotation bit information in the specific cache slice, querying a corresponding specific cache channel from the specific cache slice based on the memory annotation bit information; and generating the cache physical address mapping relationship based on the specific physical memory address and information of the corresponding specific cache channel.

6. The management method for a hybrid memory system according to claim 3, wherein the method further comprises:

acquiring a current grouped memory bank corresponding to a current program based on the memory group mapping relationship, and acquiring a current grouped memory bank memory page physical address corresponding to the current grouped memory bank;

acquiring current memory annotation bit information corresponding to the current grouped memory bank memory page physical address, and selecting a specific current memory page based on the current memory annotation bit information; and allocating a dynamic random access memory page corresponding to the specific current memory page to a write-intensive data page of the current program; and allocating a non-volatile memory page corresponding to the specific current memory page to a read-intensive data page of the current program.

7. The management method for a hybrid memory system according to claim 2, wherein the generating a memory group mapping relationship comprises:

performing remainder calculation on program identification (ID) information of the memory programs and a total number of memory groups in all the grouped memory banks, using remainder calculation results as grouped memory bank numbers that the memory programs are able to access, and dividing memory programs with a same remainder calculation result into one group.

8. The management method for a hybrid memory system according to claim 2, wherein the performing data migration based on a preset cold and hot data page migration strategy comprises:

in response to both the write hotness page migration flag information and the access hotness page migration flag information being set, when the currently accessed memory page does not belong to the dynamic random access memory area and a specific bit of a memory address corresponding to the currently accessed memory page does not conform to a specific value of a current running program, acquiring a dynamic random access memory area of the grouped memory bank where the currently accessed memory page is located, querying the dynamic random access memory area for an updated memory page with a memory address that meets program grouping requirements, and migrating data to the updated memory page.

9. The management method for a hybrid memory system according to claim 2, wherein the performing data migration based on a preset cold and hot data page migration strategy comprises:

in response to the write hotness page migration flag information being set and the access hotness page migration flag information not being set, when the currently accessed memory page does not belong to the dynamic random access memory area, acquiring a dynamic random access memory area of the grouped memory bank where the currently accessed memory page is located, querying the dynamic random access memory area for an updated memory page with a memory address that meets program grouping requirements, and migrating data to the updated memory page.

10. The management method for a hybrid memory system according to claim 2, wherein the performing data migration based on a preset cold and hot data page migration strategy comprises:

in response to the write hotness page migration flag information not being set, but the access hotness page migration flag information being set, when the lowest memory read-write attribute level allocated to the currently accessed memory page is greater than a preset lowest memory read-write attribute level threshold, determining whether the currently accessed memory page belongs to the dynamic random access memory area, and whether a specific bit of a memory address corresponding to the currently accessed memory page conforms to a specific value of a program group; and in response to at least one of the determinations not meeting requirements, acquiring a dynamic random access memory area of the grouped memory bank where the currently accessed memory page is located, querying the dynamic random access memory area for an updated memory page with a memory address that meets program grouping requirements, and migrating data to the updated memory page.

11. The management method for a hybrid memory system according to claim 2, wherein the performing data migration based on a preset cold and hot data page migration strategy comprises:

in response to the write hotness page migration flag information not being set, but the access hotness page migration flag information being set, when the highest memory read-write attribute level allocated to the currently accessed memory page is greater than a preset highest memory read-write attribute level threshold, determining whether the currently accessed memory page belongs to the dynamic random access memory area, and whether a specific bit of a memory address corresponding to the currently accessed memory page conforms to a specific value of a program group; and in response to at least one of the determinations not meeting requirements, acquiring a dynamic random access memory area of the grouped memory bank where the currently accessed memory page is located, querying the dynamic random access memory area for an updated memory page with a memory address that meets program grouping requirements, and migrating data to the updated memory page.

12. The management method for a hybrid memory system according to claim 1, wherein the performing data migration based on a preset cold and hot data page migration strategy comprises:

in response to both the write hotness page migration flag information and the access hotness page migration flag information not being set, keeping the currently accessed memory page unchanged.

13. The management method for a hybrid memory system according to claim 1, wherein before the acquiring a write hotness value and an access hotness value of a currently accessed memory page, the method further comprises:

configuring corresponding high-frequency write access page linked lists and high-frequency access memory linked lists based on the memory page information of the grouped memory banks.

14. The management method for a hybrid memory system according to claim 13, wherein the comparing the write hotness value with a specified write hotness threshold, and generating write hotness page migration flag information comprises:

in response to the write hotness value being greater than the specified write hotness threshold and the currently accessed memory page being located in a high-frequency write access page linked list of a corresponding grouped memory bank, clearing a write hotness page migration flag, and generating the write hotness page migration flag information.

15. The management method for a hybrid memory system according to claim 13, wherein the comparing the write hotness value with a specified write hotness threshold, and generating write hotness page migration flag information comprises:

in response to the write hotness value being greater than the specified write hotness threshold and the currently accessed memory page not being in a high-frequency write access page linked list of a corresponding grouped memory bank, determining whether a quantity of members in the high-frequency write access page linked list reaches a specified threshold;

in response to the quantity not reaching the specified threshold, setting a write hotness page migration flag, and generating the write hotness page migration flag information; and in response to the quantity reaching the specified threshold, comparing write access hotness values of all members in the high-frequency write access page linked list with the write hotness value corresponding to the currently accessed memory page; in response to the write hotness value being less than the write access hotness values, clearing the write hotness page migration flag, and generating the write hotness page migration flag information; and in response to the write hotness value not being less than the write access hotness values, setting the write hotness page migration flag, and generating the write hotness page migration flag information.

16. The management method for a hybrid memory system according to claim 13, wherein the comparing the write hotness value with a specified write hotness threshold, and generating write hotness page migration flag information comprises:

in response to the write hotness value not exceeding the specified write hotness threshold, clearing a write hotness page migration flag, and generating the write hotness page migration flag information.

17. The management method for a hybrid memory system according to claim 1, wherein the acquiring a write hotness value and an access hotness value of a currently accessed memory page comprises:

calculating the write hotness value of the currently accessed memory page through the following formula: $Hot_{write}=a_{11}f_0+a_{12}f_1+a_{13}f_2+a_{14}f_3+a_{15}f_4$, wherein $f_0$ represents a proportion of write access requests for the currently accessed memory page among M write access requests in a write access counter;

$f_1$ represents a proportion of the write access requests for the currently accessed memory page among latest N write access requests in the write access counter;

$f_2$ represents a proportion of the write access requests for the currently accessed memory page among latest P write access requests in the write access counter;

$f_3$ represents a proportion of the write access requests for the currently accessed memory page among latest Q write access requests in the write access counter;

$f_4$ represents a proportion of the write access requests for the currently accessed memory page among latest R write access requests in the write access counter;

$a_{11}$, $a_{12}$, $a_{13}$, $a_{14}$, and $a_{15}$ are weight parameters, and $a_{11}+a_{12}+a_{13}+a_{14}+a_{15}=1$;

calculating a read access hotness value of the currently accessed memory page through the following formula: $Hot_{read}=a_{21}f'_0+a_{22}f'_1+a_{23}f'_2+a_{24}f'_3+a_{25}f'_4$, wherein $f'_0$ represents a proportion of read access requests for the currently accessed memory page among M read access requests in a read access counter;

$f'_1$ represents a proportion of the read access requests for the currently accessed memory page among latest N read access requests in the read access counter;

$f'_2$ represents a proportion of the read access requests for the currently accessed memory page among latest P read access requests in the read access counter;

$f'_3$ represents a proportion of the read access requests for the currently accessed memory page among latest Q read access requests in the read access counter;

$f'_4$ represents a proportion of the read access requests for the currently accessed memory page among latest R read access requests in the read access counter;

$a_{21}$, $a_{22}$, $a_{23}$, $a_{24}$, and $a_{25}$ are weight parameters, and $a_{21}+a_{22}+a_{23}+a_{24}+a_{25}=1$; and calculating the access hotness value of the currently accessed memory page through the following formula: $Hot_{access}=Hot_{read}+Hot_{write}$.

18. A computer device, comprising a memory, a processor, and computer programs, the computer programs being stored in the memory and executable on the processor, and the processor, when executing the computer programs, implement steps of a management method for a hybrid memory system comprising:

acquiring a write hotness value and an access hotness value of a currently accessed memory page;

comparing the write hotness value with a specified write hotness threshold, and generating write hotness page migration flag information;

comparing the access hotness value with a specified access hotness threshold, and generating access hotness page migration flag information;

grouping a hybrid memory in the hybrid memory system, and generating memory page management information corresponding to the hybrid memory based on memory page information of all grouped memory banks; and determining whether the currently accessed memory page is a hot data page based on the write hotness page migration flag information, the access hotness page migration flag information, and current memory page management information corresponding to the currently accessed memory page, and performing data migration based on a preset cold and hot data page migration strategy;

wherein the grouping a hybrid memory in the hybrid memory system, and generating memory page management information corresponding to the hybrid memory based on memory page information of all grouped memory banks comprises:

dividing the hybrid memory in the hybrid memory system into a plurality of grouped memory banks based on a preset unified memory group capacity and a preset unified memory group memory ratio, and marshaling all the grouped memory banks;

generating the memory page management information corresponding to the hybrid memory based on the memory page information of all the grouped memory banks; and acquiring programs in the system and specified grouped memory banks corresponding to the programs, and generating a memory group mapping relationship based on program calibration information of memory programs and grouped memory bank numbers of specified grouped memory banks corresponding to the memory programs.

19. A non-transitory computer-readable storage media storing computer programs, the computer programs, when executed by a processor, enable the processor to perform steps of management method for a hybrid memory system, comprising: acquiring a write hotness value and an access hotness value of a currently accessed memory page; comparing the write hotness value with a specified write hotness threshold, and generating write hotness page migration flag information; comparing the access hotness value with a specified access hotness threshold, and generating access hotness page migration flag information; grouping a hybrid memory in the hybrid memory system, and generating memory page management information corresponding to the hybrid memory based on memory page information of all grouped memory banks; and determining whether the currently accessed memory page is a hot data page based on the write hotness page migration flag information, the access hotness page migration flag information, and current memory page management information corresponding to the currently accessed memory page, and performing data migration based on a preset cold and hot data page migration strategy; wherein the grouping a hybrid memory in the hybrid memory system, and generating memory page management information corresponding to the hybrid memory based on memory page information of all grouped memory banks comprises: dividing the hybrid memory in the hybrid memory system into a plurality of grouped memory banks based on a preset unified memory group capacity and a preset unified memory group memory ratio, and marshaling all the grouped memory banks; generating the memory page management information corresponding to the hybrid memory based on the memory page information of all the grouped memory banks; and acquiring programs in the system and specified grouped memory banks corresponding to the programs, and generating a memory group mapping relationship based on program calibration information of memory programs and grouped memory bank numbers of specified grouped memory banks corresponding to the memory programs.

20. A hybrid memory system, comprising a hybrid memory; and the hybrid memory being managed by the management method for a hybrid memory system according to claim 1.

* * * * *